United States Patent
Brundage et al.

(10) Patent No.: US 7,545,952 B2
(45) Date of Patent: Jun. 9, 2009

(54) IMAGE OR VIDEO DISPLAY DEVICES

(75) Inventors: Trent J. Brundage, Sherwood, OR (US); Tony F. Rodriguez, Portland, OR (US); Brett T. Hannigan, Philadelphia, PA (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 11/877,450

(22) Filed: Oct. 23, 2007

(65) Prior Publication Data

US 2008/0260201 A1 Oct. 23, 2008

Related U.S. Application Data

(63) Continuation of application No. 11/622,202, filed on Jan. 11, 2007, now Pat. No. 7,330,564, which is a continuation of application No. 11/060,919, filed on Feb. 17, 2005, now Pat. No. 7,164,780, which is a continuation of application No. 09/842,282, filed on Apr. 24, 2001, now Pat. No. 7,024,016.

(51) Int. Cl.
*H04K 1/00* (2006.01)

(52) U.S. Cl. .................................................. 382/100

(58) Field of Classification Search ................ 382/100, 382/232; 358/3.28; 380/52, 54, 270; 396/310; 283/72–75, 85, 93, 113, 901; 340/5.26, 5.65, 340/5.8, 5.86; 455/556.1; 235/494; 356/71; 707/9, 101; 705/44, 50, 57; 709/229; 713/165, 713/167, 176, 179; 359/642, 707; 257/427, 257/E27.132; 438/57; 345/626, 627, 634; 902/10; 726/19
See application file for complete search history.

(56) References Cited

U.S. PATENT DOCUMENTS

| 3,971,065 | A | | 7/1976 | Bayer |
| 4,241,415 | A | * | 12/1980 | Masaki et al. ............... 345/626 |
| 4,403,869 | A | | 9/1983 | Crutcher |
| 4,511,259 | A | | 4/1985 | Horiuchi |

(Continued)

FOREIGN PATENT DOCUMENTS

EP 493091 7/1992

(Continued)

OTHER PUBLICATIONS

U.S. Appl. No. 60/000,442 filed date Jun. 20, 1995, Hudetz.

(Continued)

*Primary Examiner*—Jose L Couso

(57) ABSTRACT

The present invention relates generally to image or video display devices. For example, there are many devices (e.g., cell phones, video games, calculators, positioning systems and personal computing devices) that include such display devices. One claim recites a device including: an image or video display including a first set of elements and a second set of elements, the first set of elements being varied relative to at least the second set of elements, the first set of elements being arranged to provide a plural-bit device identifier obtainable from optical scan data representing at least a portion of the image or video display, the first set of elements and the second set of elements being arranged so as to conceal the presence of the plural-bit device identifier from a human observer of the display. Of course, other claims and combinations are provided as well.

11 Claims, 6 Drawing Sheets

U.S. PATENT DOCUMENTS

| | | | |
|---|---|---|---|
| 4,590,366 A | 5/1986 | Rothfjell | |
| 4,807,031 A | 2/1989 | Broughton et al. | |
| 4,880,292 A | 11/1989 | Kageyama et al. | |
| 4,994,831 A | 2/1991 | Marandi | |
| 5,010,405 A | 4/1991 | Schreiber et al. | |
| 5,135,095 A | 8/1992 | Kocznar et al. | |
| 5,238,856 A | 8/1993 | Tokumitsu | |
| 5,321,242 A * | 6/1994 | Heath, Jr. | 235/382 |
| 5,481,377 A | 1/1996 | Udagawa et al. | |
| 5,493,143 A | 2/1996 | Hukari | |
| 5,499,294 A | 3/1996 | Friedman | |
| 5,502,576 A | 3/1996 | Ramsay et al. | |
| 5,617,119 A | 4/1997 | Briggs et al. | |
| 5,629,980 A | 5/1997 | Stefik | |
| 5,663,766 A | 9/1997 | Sizer, II | |
| 5,671,267 A | 9/1997 | August et al. | |
| 5,671,277 A | 9/1997 | Ikenoue et al. | |
| 5,692,073 A | 11/1997 | Cass | |
| 5,699,427 A | 12/1997 | Chow et al. | |
| 5,715,403 A * | 2/1998 | Stefik | 705/44 |
| 5,717,940 A | 2/1998 | Peairs et al. | |
| 5,761,686 A | 6/1998 | Bloomberg | |
| 5,764,770 A | 6/1998 | Schipper et al. | |
| 5,765,152 A | 6/1998 | Erickson | |
| 5,765,176 A | 6/1998 | Bloomberg | |
| 5,771,071 A | 6/1998 | Bradley et al. | |
| 5,772,250 A | 6/1998 | Gasper | |
| 5,796,154 A | 8/1998 | Sano et al. | |
| 5,893,908 A | 4/1999 | Cullen et al. | |
| 5,901,224 A | 5/1999 | Hecht | |
| 5,903,729 A | 5/1999 | Reber et al. | |
| 5,919,730 A | 7/1999 | Gasper et al. | |
| 5,933,498 A | 8/1999 | Schneck et al. | |
| 5,937,207 A | 8/1999 | Ito et al. | |
| 5,943,422 A | 8/1999 | Van Wie | |
| 5,951,055 A | 9/1999 | Mowry, Jr. | |
| 5,978,477 A | 11/1999 | Hull et al. | |
| 5,978,773 A | 11/1999 | Hudetz et al. | |
| 5,995,978 A | 11/1999 | Cullen et al. | |
| 6,001,540 A | 12/1999 | Huang et al. | |
| 6,006,226 A | 12/1999 | Cullen et al. | |
| 6,038,333 A | 3/2000 | Wang | |
| 6,085,205 A | 7/2000 | Peairs et al. | |
| 6,119,944 A | 9/2000 | Mulla et al. | |
| 6,122,403 A | 9/2000 | Rhoads | |
| 6,130,741 A | 10/2000 | Wen et al. | |
| 6,182,090 B1 | 1/2001 | Peairs | |
| 6,199,073 B1 | 3/2001 | Peairs et al. | |
| 6,223,166 B1 | 4/2001 | Kay | |
| 6,233,684 B1 | 5/2001 | Stefik et al. | |
| 6,243,480 B1 | 6/2001 | Zhao et al. | |
| 6,247,050 B1 | 6/2001 | Tso et al. | |
| 6,249,588 B1 | 6/2001 | Amidror et al. | |
| 6,249,870 B1 | 6/2001 | Kobayashi et al. | |
| 6,252,218 B1 | 6/2001 | Chou | |
| 6,256,110 B1 | 7/2001 | Yoshitani | |
| 6,282,362 B1 | 8/2001 | Murphy et al. | |
| 6,314,457 B1 | 11/2001 | Schena et al. | |
| 6,320,675 B1 | 11/2001 | Sakaki et al. | |
| 6,325,420 B1 | 12/2001 | Zhang et al. | |
| 6,334,721 B1 | 1/2002 | Horigane | |
| 6,351,815 B1 | 2/2002 | Adams | |
| 6,359,837 B1 | 3/2002 | Tsukamoto | |
| 6,369,904 B1 | 4/2002 | Bhattacharjya et al. | |
| 6,384,935 B1 | 5/2002 | Yamazaki | |
| 6,385,329 B1 | 5/2002 | Sharma | |
| 6,408,082 B1 | 6/2002 | Rhoads | |
| 6,438,251 B1 | 8/2002 | Yamaguchi | |
| 6,439,465 B1 | 8/2002 | Bloomberg | |
| 6,495,813 B1 | 12/2002 | Fan et al. | |
| 6,512,919 B2 | 1/2003 | Ogasawara | |
| 6,522,770 B1 | 2/2003 | Seder et al. | |
| 6,535,618 B1 | 3/2003 | Rhoads | |
| 6,535,629 B2 | 3/2003 | McCormick et al. | |
| 6,573,916 B1 | 6/2003 | Grossweiler, III et al. | |
| 6,577,746 B1 | 6/2003 | Evans | |
| 6,614,914 B1 | 9/2003 | Rhoads | |
| 6,614,915 B2 | 9/2003 | Powell et al. | |
| 6,643,386 B1 | 11/2003 | Foster | |
| 6,656,760 B2 | 12/2003 | Schmitz | |
| 6,694,043 B2 | 2/2004 | Seder et al. | |
| 6,701,522 B1 | 3/2004 | Rubin et al. | |
| 6,736,322 B2 | 5/2004 | Gobburu et al. | |
| 6,737,719 B1 | 5/2004 | Yamamoto | |
| 6,786,397 B2 | 9/2004 | Silverbrook et al. | |
| 6,818,276 B2 | 11/2004 | Bourdelais et al. | |
| 6,894,794 B1 | 5/2005 | Patton et al. | |
| 6,916,680 B2 | 7/2005 | Lee et al. | |
| 6,947,571 B1 | 9/2005 | Rhoads et al. | |
| 6,968,072 B1 | 11/2005 | Tian | |
| 6,968,455 B2 | 11/2005 | Okayasu et al. | |
| 7,007,243 B2 | 2/2006 | Baldino | |
| 7,024,016 B2 | 4/2006 | Rhoads et al. | |
| 7,080,041 B2 | 7/2006 | Nagel | |
| 7,089,420 B1 | 8/2006 | Durst | |
| 7,123,740 B2 | 10/2006 | McKinley | |
| 7,162,035 B1 | 1/2007 | Durst et al. | |
| 7,164,780 B2 | 1/2007 | Brundage et al. | |
| 7,196,388 B2 | 3/2007 | Wu | |
| 7,227,692 B2 | 6/2007 | Li et al. | |
| 7,330,564 B2 | 2/2008 | Brundage et al. | |
| 2001/0001854 A1 | 5/2001 | Schena et al. | |
| 2001/0006585 A1 | 7/2001 | Horigane | |
| 2001/0011233 A1 | 8/2001 | Narayanaswami | |
| 2001/0016852 A1 | 8/2001 | Peairs et al. | |
| 2001/0026377 A1 | 10/2001 | Ikegami | |
| 2001/0043362 A1 | 11/2001 | Hull et al. | |
| 2001/0046307 A1 | 11/2001 | Wong | |
| 2001/0051915 A1 | 12/2001 | Ueno et al. | |
| 2001/0051964 A1 | 12/2001 | Warmus et al. | |
| 2002/0006212 A1 | 1/2002 | Rhoads et al. | |
| 2002/0018879 A1 | 2/2002 | Barnhart et al. | |
| 2002/0023027 A1 | 2/2002 | Simonds | |
| 2002/0023148 A1 | 2/2002 | Ritz et al. | |
| 2002/0023218 A1 | 2/2002 | Lawandy et al. | |
| 2002/0048369 A1 | 4/2002 | Ginter et al. | |
| 2002/0054356 A1 | 5/2002 | Kurita et al. | |
| 2002/0075298 A1 | 6/2002 | Schena et al. | |
| 2002/0078357 A1 | 6/2002 | Bruekers et al. | |
| 2002/0080271 A1 | 6/2002 | Eveleens et al. | |
| 2002/0080396 A1 | 6/2002 | Silverbrook et al. | |
| 2002/0085238 A1 | 7/2002 | Umeda | |
| 2002/0085759 A1 | 7/2002 | Davies et al. | |
| 2002/0097420 A1 | 7/2002 | Takaragi et al. | |
| 2002/0106102 A1 | 8/2002 | Au et al. | |
| 2002/0112171 A1 | 8/2002 | Ginter et al. | |
| 2002/0118394 A1 | 8/2002 | Mckinley et al. | |
| 2002/0153661 A1 | 10/2002 | Brooks et al. | |
| 2002/0191810 A1 | 12/2002 | Fudge et al. | |
| 2002/0195495 A1 | 12/2002 | Melick et al. | |
| 2003/0032033 A1 | 2/2003 | Anglin et al. | |
| 2003/0066883 A1 | 4/2003 | Yu | |
| 2003/0164400 A1 | 9/2003 | Boyd | |
| 2004/0162981 A1 | 8/2004 | Wong | |
| 2005/0111723 A1 | 5/2005 | Hannigan et al. | |
| 2005/0169499 A1 | 8/2005 | Rodriguez et al. | |

2006/0012562 A1    1/2006   Pope et al.

FOREIGN PATENT DOCUMENTS

JP            850598        2/1996

OTHER PUBLICATIONS

Bloomberg, "Embedding Digital Data on Paper in Iconic Text" SPIE vol. 3027, Document Recognition IV, pp. 67-80 (1997).
Johnson, et al., "Bridging the Paper and Electronic Worlds: The Paper User Interface", Interchi '93, pp. 507-512, Apr. 1993.
Newman, William, et al. "A Desk Supporting Computer-Based Interaction with paper Documents," ACM Conference on Human Factors in Computing Systems (CHI '92) May 3-7, 1992, pp. 587-592.
Peairs, "Iconic Paper," Proceedings of the Third International Conference on Document Analysis and Recognition (ICDAR '95), pp. 1174-1179, 1995.
Rao, et al. "Protofoil: Storing and Finding the Information Worker's Paper Documents in an Electronic File Cabinet," Human Factors in Computing Systems (CHI '94), pp. 180-186, Boston, MA, Apr. 1884.
Whittaker, et al., Back to the Future: Pen and Paper Technology Supports Complex Group.
Coordination, CHI '95, Conference on Human Factors in Computing Systems, Denver, Colorado (May 7-11, 1995) (text copy obtained from ACM).

Oct. 20, 2008 Reply Brief: Oct. 28, 2008 Examiner's Answer to Appeal Brief; Aug. 4, 2008 Appeal Brief: and Dec. 10, 2007 final Office Action: all from assignee's U.S. Appl. No. 11/051,502 (published as US 2005-0169499 A1).
Oct. 12, 2007 Notice of Allowance; Oct. 1, 2007 Amendment with RCE (and Request correcting inventorship): Aug. 15, 2007 Notice of Allowance; Jul. 27, 2007 Amendment; May 3, 2007 non-final Office Action; all from assignee's U.S. Appl. No. 11/622,202 (now US Patent No. 7,330,564).
Aug. 24, 2006 Notice of Allowance; Aug. 7, 2006 Amendment; Jul. 28, 2006 Amendment (including Request to correct inventorship); Jul. 17, 2006 non-final Office Action; all from assignee's U.S. Appl. No. 11/060,919 (now US Patent No. 7,164,780).
Mar. 20, 2006 Notice of Allowance and Examiner's Interview Summary; Dec. 21, 2005 Pre-Brief Appeal Conference decision: Nov. 10, 2005 Pre-Brief Conference Request; Aug. 9, 2005 final Office Action; and May 9, 2005 Amendment; all from assignee U.S. Appl. No. 10/029,229 (now U.S. Patent No. 7,123,740).
Dec. 30, 2004 Office Action from U.S. Appl. No. 09/932,667 (published as US 2002-0023027 A1).
Nov. 6, 2008 Pre-Brief Conference Request (including 5 pages of Reasons); Nov. 4, 2008 final Office Action; and Oct. 17, 2008 Supplemental Amendment; all from assignee's U.S. Appl. No. 10/973,934 (published as US 2005-0111723 A1).

* cited by examiner

IMAGE OR VIDEO DISPLAY DEVICES

RELATED APPLICATION DATA

This application is a continuation of U.S. patent application Ser. No. 11/622,202, filed Jan. 1, 2007 (published as US 2007-0110275 A1), which is a continuation of U.S. patent application Ser. No. 11/060,919, filed Feb. 17, 2005 (U.S. Pat. No. 7,164,780), which is a continuation of U.S. patent application Ser. No. 09/842,282, filed Apr. 24, 2001 (U.S. Pat. No. 7,024,016). The above patent documents are hereby incorporated herein by reference.

FIELD OF THE INVENTION

The present invention relates to digital watermarking, and is particularly illustrated with reference to handheld computing devices and data management systems.

BACKGROUND AND SUMMARY OF THE INVENTION

Computers continue to evolve. Time has witnessed huge, lumbering computers give way to nimble and powerful desktop, laptop, and handheld computing devices. Computational power has increased on almost an exponential curve, while size and portability of computing devices have significantly reduced.

People, once shackled to their computers, now experience new-found freedom as cell phones, video games, calculators, positioning systems, and personal computing devices become increasingly capable.

Traditional notions of computing are being challenged. Telecommuting is now common. A person can retreat to the mountains, walk along a trout-filled stream, and still remain connected to the business world. A parent can cheer on the sidelines of a soccer game and still pack along a virtual workspace on a handheld device. Advances in wireless communication and satellite systems provide increasing flexibility.

Life-changing advances are anticipated as computers continue to evolve.

The present invention employs digital watermarking techniques to even further increase the applications and flexibility of computers and computer-assisted activities. In some embodiments, digital watermarking techniques are combined with handheld computing devices. In other embodiments, digital watermarking techniques are employed with a document and/or data management systems. In still other embodiments, digital watermarking system and methods provide convenience and computing enhancements.

Digital watermarking, a form of steganography, is the science of encoding physical and electronic objects with plural-bit digital data, in such a manner that the data is essentially hidden from human perception, yet can be recovered by computer analysis. In physical objects, the data may be encoded in the form of surface texturing, or printing. Such marking can be detected from optical scan data, e.g., from a scanner, optical reader, input device, digital camera, or web cam. In electronic objects (e.g., digital audio or imagery—including video), the data may be encoded as slight variations in sample values. Or, if the object is represented in a so-called orthogonal domain (also termed "non-perceptual," e.g., MPEG, DCT, wavelet, etc.), the data may be encoded as slight variations in quantization values or levels. The assignee's U.S. Pat. No. 6,122,403 and U.S. application Ser. No. 09/503,881 (now U.S. Pat. No. 6,614,914) are illustrative of certain watermarking technologies. Artisans know many others.

Digital watermarking systems typically have two primary components: an encoder that embeds the watermark in a host media signal, and a decoder that detects and reads the embedded watermark from a signal suspected of containing a watermark (e.g., a suspect signal). The encoder embeds a watermark by altering the host media signal. The decoder component analyzes a suspect signal to detect whether a watermark is present. In applications where the watermark encodes information, the decoder extracts this information from the detected watermark.

The analysis of the detected data can be accomplished in various ways. Presently, most steganographic decoding relies on general purpose microprocessors that are programmed by suitable software instructions to perform the necessary analysis. Other arrangements, such as using dedicated hardware, reprogrammable gate arrays, or other techniques, can of course be used.

Determining orientation of embedded data can be discerned by reference to visual clues. For example, some objects include subliminal graticule data, or other calibration data, steganographically encoded with the embedded data to aid in determining orientation. Others objects can employ overt markings, either placed for that sole purpose (e.g. reference lines or fiducials), or serving another purpose as well (e.g. lines of text), to discern orientation. Edge-detection algorithms can also be employed to deduce the orientation of the object by reference to its edges.

In one example, subliminal graticule data can be sensed to identify the locations within the image data where the binary data is encoded. The nominal luminance of each patch before encoding (e.g., background shading on a document) is slightly increased or decreased to encode a binary "1" or "0." The change is slight enough to be generally imperceptible to human observers, yet statistically detectable from the image data. Preferably, the degree of change is adapted to the character of the underlying image, with relatively greater changes being made in regions where the human eye is less likely to notice them. Each area thus encoded can convey plural bits of data (e.g., 16-256 bits).

One problem that arises in many watermarking applications is that of object or positioning corruption. If the object is reproduced, skewed, or distorted, in some manner such that the content presented for watermark decoding is not identical to the object as originally watermarked, then the decoding process may be unable to recognize and decode the watermark. To deal with such problems, the watermark can convey a reference signal. The reference signal is of such a character as to permit its detection even in the presence of relatively severe distortion. Once found, the attributes of the distorted reference signal can be used to quantify the content's distortion. Watermark decoding can then proceed—informed by information about the particular distortion present.

The assignee's U.S. application Ser. No. 09/503,881 (now U.S. Pat. No. 6,614,914) and Ser. No. 09/452,023 (now U.S. Pat. No. 6,408,082) detail certain reference signals, and processing methods, that permit such watermark decoding even in the presence of distortion. In some image watermarking embodiments, the reference signal comprises a constellation of quasi-impulse functions in the Fourier magnitude domain, each with pseudorandom phase. To detect and quantify the distortion, the watermark decoder converts the watermarked image to the Fourier magnitude domain and then performs a log polar resampling of the Fourier magnitude image. A generalized matched filter correlates the known orientation signal with the re-sampled watermarked signal to find the rotation and scale parameters providing the highest correlation. The watermark decoder performs additional correlation operations between the phase information of the known orientation signal and the watermarked signal to determine translation parameters, which identify the origin of the watermark message signal. Having determined the rotation, scale and translation of the watermark signal, the reader then adjusts the image data to compensate for this distortion, and extracts the watermark message signal as described above.

Such watermarking techniques, and many others known to those skilled in the art, may be suitably employed with the present invention.

The foregoing and other features and advantages of the present invention will be more readily apparent from the following detailed description, which proceeds with reference to the accompanying drawings.

DETAILED DESCRIPTION

The present invention provides increased flexibility through digital watermarking technology. The following section describes a computing device capable of supporting watermarking software and/or functionality. (It should be appreciated that the illustrated device is only one possible computing platform. There are many others capable of supporting watermark embedding and decoding. It is also anticipated that there will be advances in the handheld computing field, and such advances may be suitably interchangeably incorporated with aspects of the present invention.).

Handheld Computing Device

A typical handheld device (also call a Personal Digital Assistant or PDA) can function as a cellular phone, fax sender, and personal organizer. Some PDAs are hand-held PC with tiny keyboards. Another device uses a touch-screen and stylus for data entry.

Figure 1:
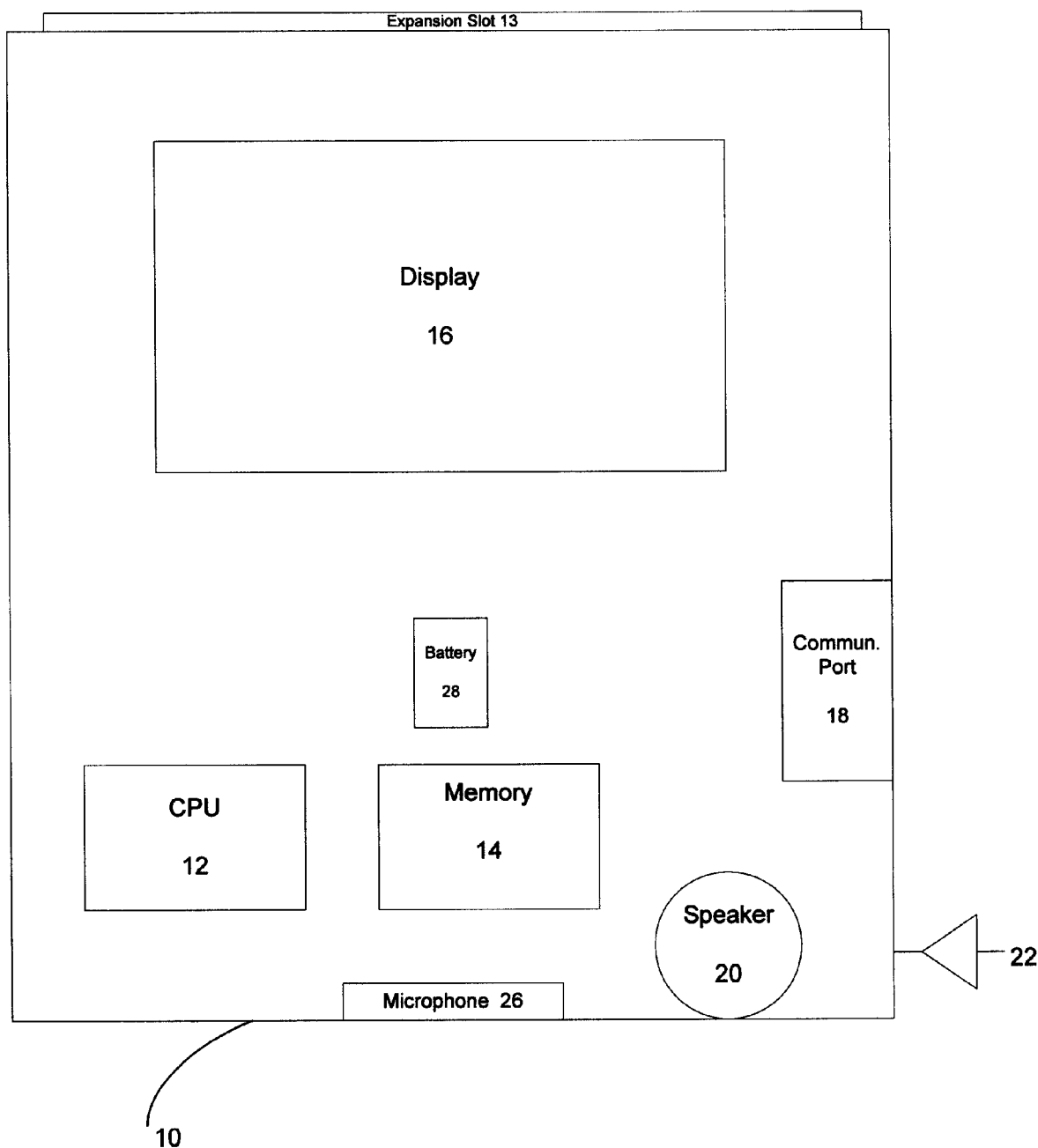
FIG. 1 is a block diagram of a handheld computing device.

A handheld computing device 10 is now described with reference to FIG. 1. The device 10 preferably includes a processor 12 or other processing circuitry. One common processor is the 206 MHz Intel StrongArm, a 32-bit RISC processor. Of course, many other processors, like those made by Motorola, can alternatively be used. Indeed, as with other components discussed herein, it is anticipated that improvements will be made with respect to handheld processors. For example, the computation power and processing speed of handheld processors will surely continue to increase. Such improved components may be suitably interchanged with the present invention.

Memory 14 is preferably provided in the device. Memory 14 can include RAM (e.g., SDRAM), ROM, flash memory, optical, and/or magnetic memory. Device 10 can also communicate with external or expansion memory.

Device 10 also preferably includes sufficient bus structure (not shown) to facilitate communication between the various device components discussed herein. In one embodiment, device 10 includes an expansion slot 13, which is a compartment or communication port to plug expansion cards or devices such as a video card, wireless or satellite modem, additional memory, GPS receiver, sound card, etc., and connect them to the system bus structure. (Of course, GPS refers to a Global Positioning System, which is satellite-based radio positioning system that provides three-dimensional position, velocity and time information to a GPS receiver, anywhere on or near the surface of the Earth.).

Device 10 can include a plurality of output devices. For example, device 10 can include a display area 16 (e.g., a LCD screen, thin film LCD, etc.), communication port 18, speaker 20, wireless transceiver 22, and printer 24. (Of course, not all of these components are necessary, and may be included as optional features or plug-in devices.). The communication port 18 may include a single or a plurality of ports, for example, an infrared port, serial port (e.g., RS 232 serial port), parallel port, synchronization port, Universal Serial Bus (USB), etc. Communication port 18 may be used to communicate with peripherals (e.g., web cameras, digital camera, cell phones, modems, a computer network, a stand alone computer, scanner, GPS receiver, etc.) or with a host computer. In one embodiment, communication port 18 includes an audio/video output jack or port.

Wireless transceiver 22 may support a variety of communication platforms, and may even include cell phone or satellite transmission capabilities. (Alternatively, a cell or satellite phone communicates with device 10 via communication port 18 or expansion slot 13).

In one embodiment, wireless transceiver 22 communicates with a computer network, using a communication protocol such as Bluetooth. As will be appreciated by those skilled in the art, Bluetooth is a wireless communication technology that allows mobile phones, personal digital assistants (PDAs), PCs and other electronic devices to talk to each other. Bluetooth is a specification for small form factor, low-cost, short-range radio links between a variety of portable and mobile computing devices. For more information, see the Bluetooth Special Interest Group web site at www.bluetooth.com. Of course, device 10 may support other communication standards, besides Bluetooth.

Figure 2A:
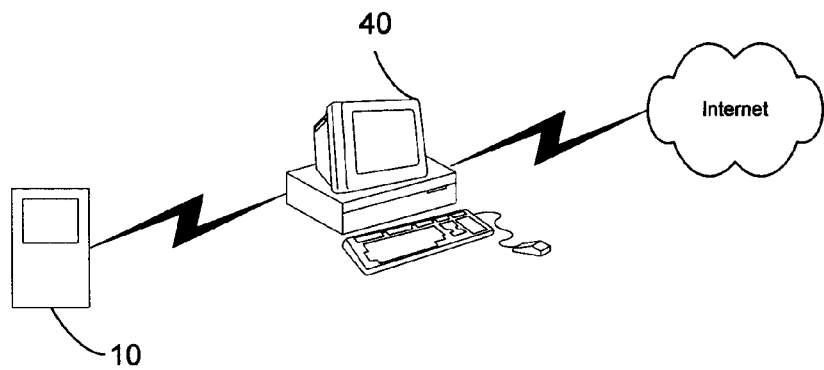
FIGS. 2A, 2B and 2C are functional diagrams illustrating various communication paths for the handheld computing device of FIG. 1.
Figure 2B:
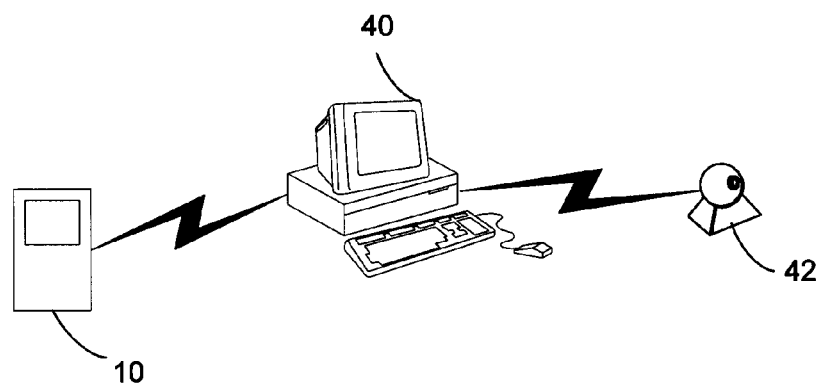
Figure 2C:
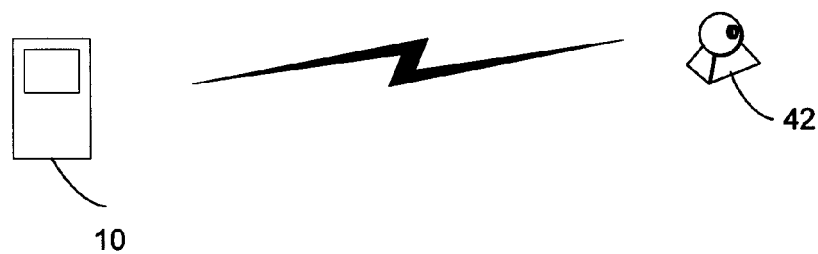

In one embodiment, wireless transceiver 22 communicates with a host computer 40 to establish an internet or other network connection (FIG. 2A). In another embodiment, handheld device 10 communicates directly with a dial-up or internet service provider, via a mobile phone, modem or wireless connection. In some embodiments, a peripheral device (e.g., a camera, web cam, scanner, GPS, transceiver, optical sensor, imaging sensor, mouse, keyboard, etc.) communicates with a host computer 40, which then relays the peripheral signal to handheld device 10 (FIG. 2B). In still another embodiment, a peripheral device 42 communicates directly with the handheld device (FIG. 2C).

Printer 24 is an optional component, which may be integral to device 10, or may be in communication with device 10. Printer 24 may include a print head or thermal printing element. Alternatively, printer 24 may include an ink-jet or laser-jet based printing system.

Device 10 preferably includes input devices, buttons or ports as well. For example, device 10 may optionally include a pen-touch interface to receive handwritten characters. Device 10 may also optionally include a microphone 26, through which device 10 responds to voice activated commands or to capture audio for recording. (Of course, voice recognition software may be running to help with the voice-activation.). A fold up (or on a display screen) keyboard can also be used for data entry. (Of course, communication port 18 is another source for data entry.). In another embodiment, device 10 includes or communicates with input devices such as a scanner, mouse, keyboard, modems, wireless transceivers, etc., etc.). In another embodiment, device 10 includes a touch screen. (Device 10 may optionally include various launch buttons, which when selected, launch a particular program or software routine.).

Device 10 may optionally include, or communicate with, a digital camera, video capture device, web cam, optical sensor, digital eye module (such as those provided by LightSurf, Inc., etc.), etc. Such digital eye modules typically include features such as a complete camera on a chip, CMOS imaging sensor, and/or miniaturized lens and imaging software. Other imaging devices include a CCD image sensor.

Power can be provided to device 10 in many ways. In one embodiment, device 10 includes a battery 28, e.g., such as a lithium-polymer battery, etc. In another embodiment, device 10 includes an energy cell, which is rechargeable. (Device 10 may also include an interface or port to receive power. USB or cradle recharging is even possible.). An on/off switch can also be provided for device 10. (In one embodiment, software automatically shuts down the device 10 after a predetermined period of inactivity. Power is conserved as a result.).

Various software applications can be stored and run on device 10. Microsoft Corp. even has a Pocket PC Windows operating system. Palm and Handspring have their own operating systems. Many other software modules and applications are supported on handheld devices, such as word processing, device drivers, internet surfing or exploring, database management, communications, personal organization software, and many, many others.

As will be appreciated by one of ordinary skill in the art, suitable software programming instructions executing via processor 12 can be used to affect various types of watermark embedding and detection. To increase performance, software-programming instructions can be optionally written as fixed-point based code, instead of floating-point based code. In another embodiment, only watermark embedding or detecting software-programming instructions are stored on device 10, and executed when needed.

There are many other handheld devices offered by a gaggle of manufactures, which may suitably support watermarking software or watermarking functionality a few such manufacturer and products are: HP (e.g., the Jornada 520/540 series), Compaq (e.g., the iPac Pocket PC), Handspring, Inc., and Palm, Inc. Some of these handheld devices combine computing, telephone/fax and networking features. Of course, it is expected that these devices, and others, will continue to improve. Such improvement may be readily incorporated with the present invention.

User Applications

The following sections disclose various inventive methods and systems, in which device 10 executing watermarking software (decoding and/or embedding) is employed. In some cases, a networked computer, instead of a handheld device is used. (Although some of the following applications are described with reference to a handheld computing device, it will be understood that a compliant desktop or laptop computer could alternatively be employed. The term "compliant" in this disclosure implies that the device is able to embed and/or decode digital watermarks.).

Inventory Control

Figure 3:
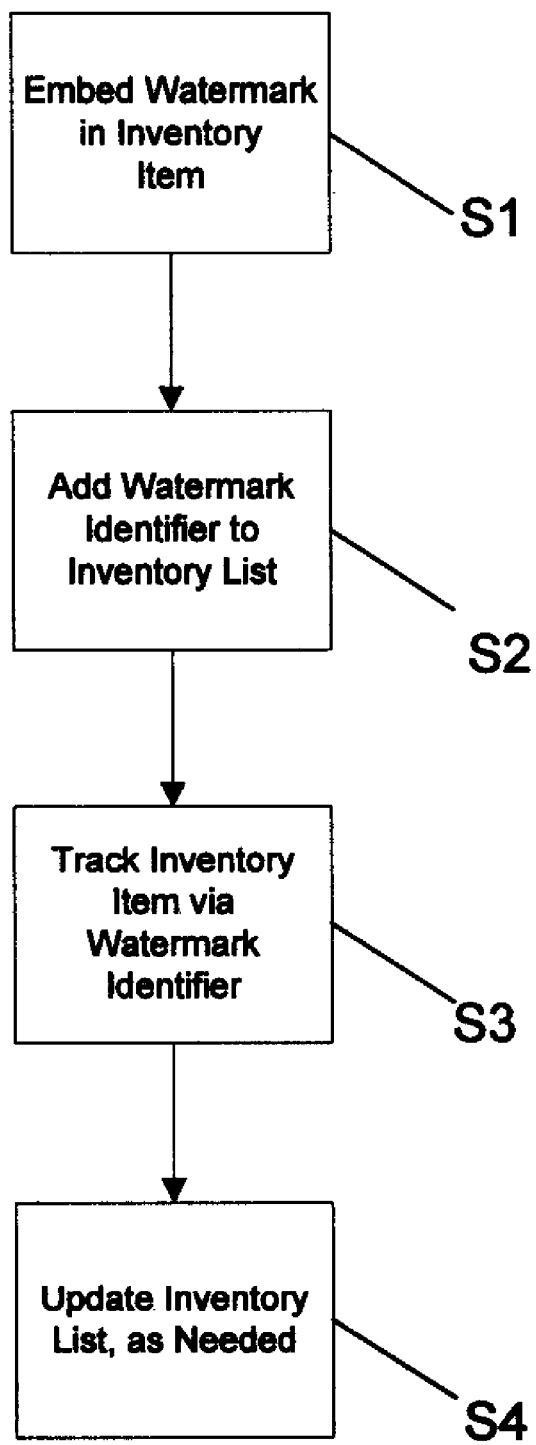
FIG. 3 is a flow diagram of a process for inventory management.

A compliant handheld device 10 is ideal for helping to track and manage inventory. Consider a warehouse or store with inventory (e.g., 100 widgets and 50 wobits.). The handheld device 10, via printer 24, prints a watermark onto each of the inventory items (see FIG. 3, step S1). Preferably, the watermark is directly printed or impressed onto an inventory item. Alternatively, a watermark is printed on a sticker or adhesive tag that is applied to the inventory item. An inventory watermark preferably includes a unique identifier, which identifies the type of inventory item (e.g., a widget or wobit), and optionally, an item number identifier (e.g., widget number 26). In another identifying scheme, each inventory item is uniquely identified. Unique identifiers, representing inventory items, can be maintained in an inventory list (step S2). Of course, database management software can be used to help manage and update the inventory list.

The printing of the watermark can encompass artwork or printing on the inventory item or tag, the printed background, numbering, lines on the item or tag, a laminate layer applied to the item or tag, surface texture, etc. If a photograph, line design, or drawing is present, it too can be encoded. A variety of watermark encoding techniques are detailed in the patent documents discussed herein; artisans in the field know many more.

Device 10 can maintain an inventory listing for each printed tag. Of course, device 10 can maintain a subset of inventory information as well. Alternatively, device 10 can communicate with a central computer 40, which maintains the inventory listing. Checkout stations, roving cashiers, and inventory controllers can carry or be equipped with compliant computing devices. These devices track inventory (e.g., by reading the embedded watermark, extracting the identifier(s), and recording or communicating activity) as it is shelved, shipped, returned and/or sold (step S3). For example, a cashier with a compliant device reads a watermark as an inventory item is purchased. The unique identifier and, optionally, a unit number, is extracted from the watermark. The inventory listing can be updated accordingly to reflect the purchase (or shipment, or shelving). In one embodiment, a plurality of handheld devices is in communication with a host computer. Changes in inventory can be updated in real-time. In another embodiment, compliant devices periodically communicate with the central computer. In still another embodiment, a handheld computing device maintains the central database. Inventory can be tracked efficiently as such.

Verification Aids for the Seeing Impaired

Another method and system that is particularly well suited for practice with a compliant handheld device involves watermarking monetary objects (e.g., currency, bills, coins, treasury bonds, cashier's checks, traveler's checks, notes, food stamps, etc.). Monetary objects are watermarked to indicate denomination, such as the amount of the object. In one embodiment, a watermark payload indicates that a five-dollar bill, is in fact, a five-dollar bill. Alternatively, in another embodiment, the watermark itself identifies the respective type of monetary object. Optionally, a monetary object is digitally watermarked to include the source of the object, e.g., U.S., Euro, France, Mexico, etc.

Figure 4:
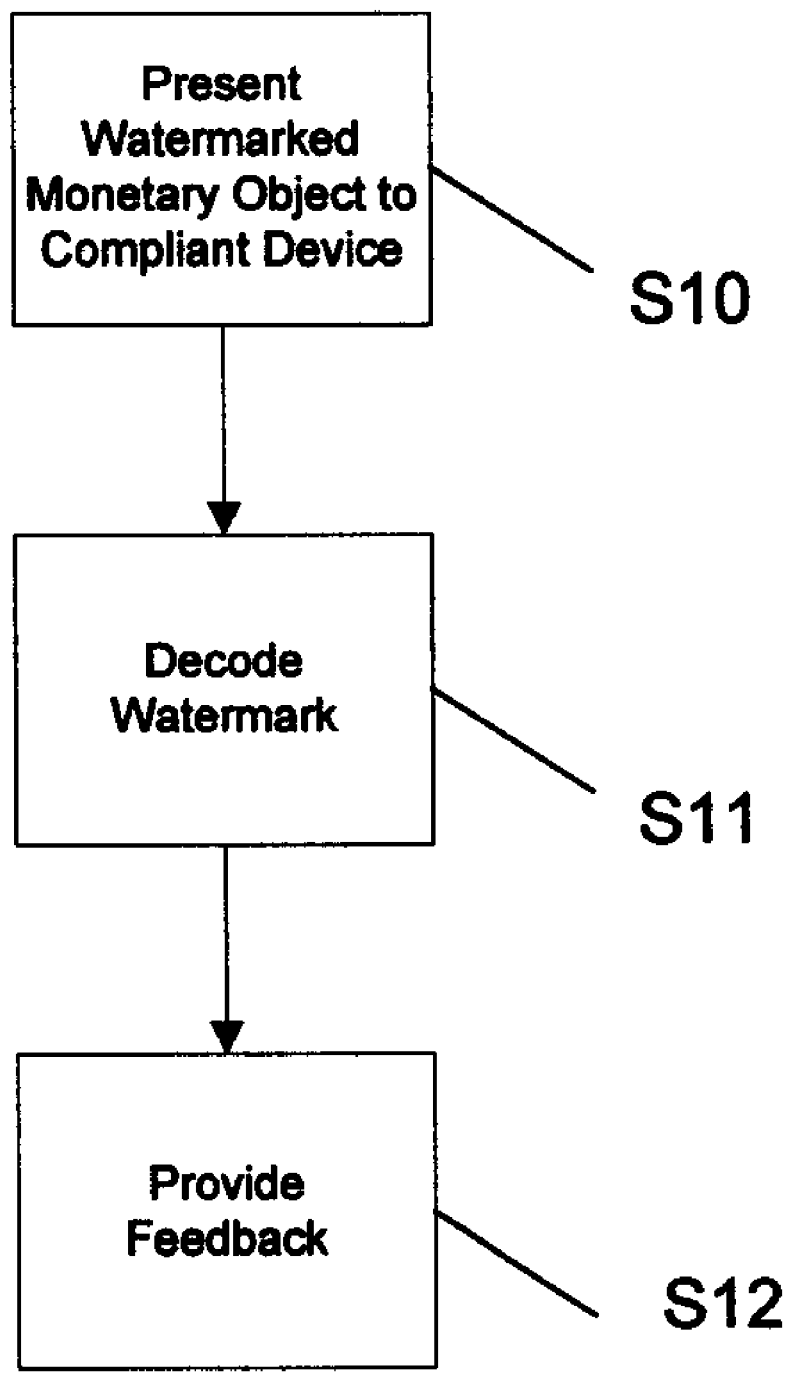
FIG. 4 is a flow diagram of a process involving watermarking monetary objects.

A monetary object is present to a compliant reading device, such as a handheld device 10 (see FIG. 4, step S10). The compliant device reads a digitally watermarked monetary object, and extracts the denomination information (step S11).

The denomination information is handled by the compliant reading device (or a device in communication with the compliant device), which provides feedback to a user (step S12).

In one embodiment, the compliant reading device includes audio or voice synthesis, which announces the monetary denomination (e.g., announces "ten dollars," when a ten dollar bill is decoded). In another embodiment, the compliant reading device communicates with a Braille output device, which signals the monetary object's size. (Other textile-based feedback can alternatively be provided.). A seeing impaired individual is no longer dependent upon a potentially unscrupulous cashier when making payments or receiving change. Instead, the individual digitally reads the embedded watermark to determine currency size and/or type and receives an audible (or other) indication of bill or currency size.

To implement such, watermark payload bits are set to identify corresponding currency. When decoded by a compliant device, the payload bits are used by a device to index a predetermined wave (or audio) file. The file can be rendered or played to announce the corresponding bill (or other monetary object) size. The payload bits can be feed directly to an audio-synthesis chip. The audio-synthesis chip can be alternatively preprogrammed to respond to various payloads. For example, the payload bits of a five dollar bill trigger an audio synthesis of "five" or "five dollars," etc. Alternatively, the payload bits can be handled by software, which activates a feedback device to provide predetermined feedback based on the payload bits. The feedback can be changed from time to time, but is still triggered based on the payload. In another embodiment, the type of watermark, and not the payload, triggers like functionality.

(Although this embodiment is particularly well suited for handheld devices, the present invention is not so limited. Indeed, a cashier station or checkout stand could be equipped with a compliant reading device, which is available to seeing impaired individuals. The compliant device can be periodically inspected to ensure that it is providing accurate results. The complaint device could decode the watermark and respond accordingly, e.g., announce bill size based on the type of watermark, or on a watermark's payload. A compliant device could also be internet-based, for example, using Digimarc MediaBridge technology. The monetary object identifier is decoded and provided to a Digimarc server (e.g., an online server). The watermark identifier is associated with a URL or other information. The URL or other information includes the corresponding correct feedback to be provided to the user. In this case, an audio signal or file can be provided to announce the denomination. In still another embodiment, a signal from the corresponding URL server activates a Braille or other output device.).

Street signs, restaurant menus, grocery store isles (and goods) can be watermarked to provide similar feedback. In this case, a sign, menu or item can be embedded with a unique identifier. A compliant device can extract an identifier, which it relays (e.g., via a wireless or other communications channel) to a central database. The central database retrieves related information (audio files, Braille enabling commands, etc.) and communicates such to the querying device. In one embodiment, the database is accessed via the internet. In another embodiment, a handheld device includes a library or database of identifies and related information. In this case, the handheld device need not query an online database, but may look to its stored database.

Document Management System

Digital watermarks may also be used to help manage documents and provide quality assurance. As will be appreciated, there are several document-management and quality assurance standards in place. ISO 9000 is one example. There are many others. Some such standards mandate that only the most recent version of a printed document be retained, a document history be maintained, and/or security be implemented.

Consider the following embodiment. Each time a document is printed, an identifier is steganographically embedded therein in the form of a digital watermark. The identifier identifies document data, e.g., such as a document file name, document version number, creation and/or print time, author, edited by, printer location, etc. (Once obtained, this document data can either be contained in the embedded watermark itself, or contained in a database to which the watermark represents a pointer, or both.). A database can be used to track documents and revisions to such, based on unique identifiers assigned per print, or edit, or session, or etc.

A printed, watermarked document then becomes a portal to related information, or a gatekeeper to help track document history. Consider a typically office situation, in which documents are printed and then edited/updated, and where several people have access to an electronic copy of the document. A user presents a printed document to a compliant device. An image of the document is captured by an input device, e.g., via digital camera, optical sensor, laser scanner, web cam, digital eye, CCD or CMOS imaging sensor, or scanner. The embedded watermark is decoded from the captured image. Related information can then be determined from the database. For example, the extracted watermark information uniquely identifies the document, e.g., via the document data. If the document is in an electronic form, it to can be digitally watermarked. The watermark can be used to track and identify the document.

In one embodiment, the document data is compared with the database information to determine whether the printed copy is the most recent copy. Additional information can be determined as well. For example, the author of the latest revisions can be identified, upcoming deadlines, or sensitive conditions (e.g., contract terms or confidentiality agreements) can be presented to the user. (Preferably the compliant computing device includes a user interface, through which such information is relayed. In another embodiment, such information is communicated to a user's designated handheld device.).

Figure 5:
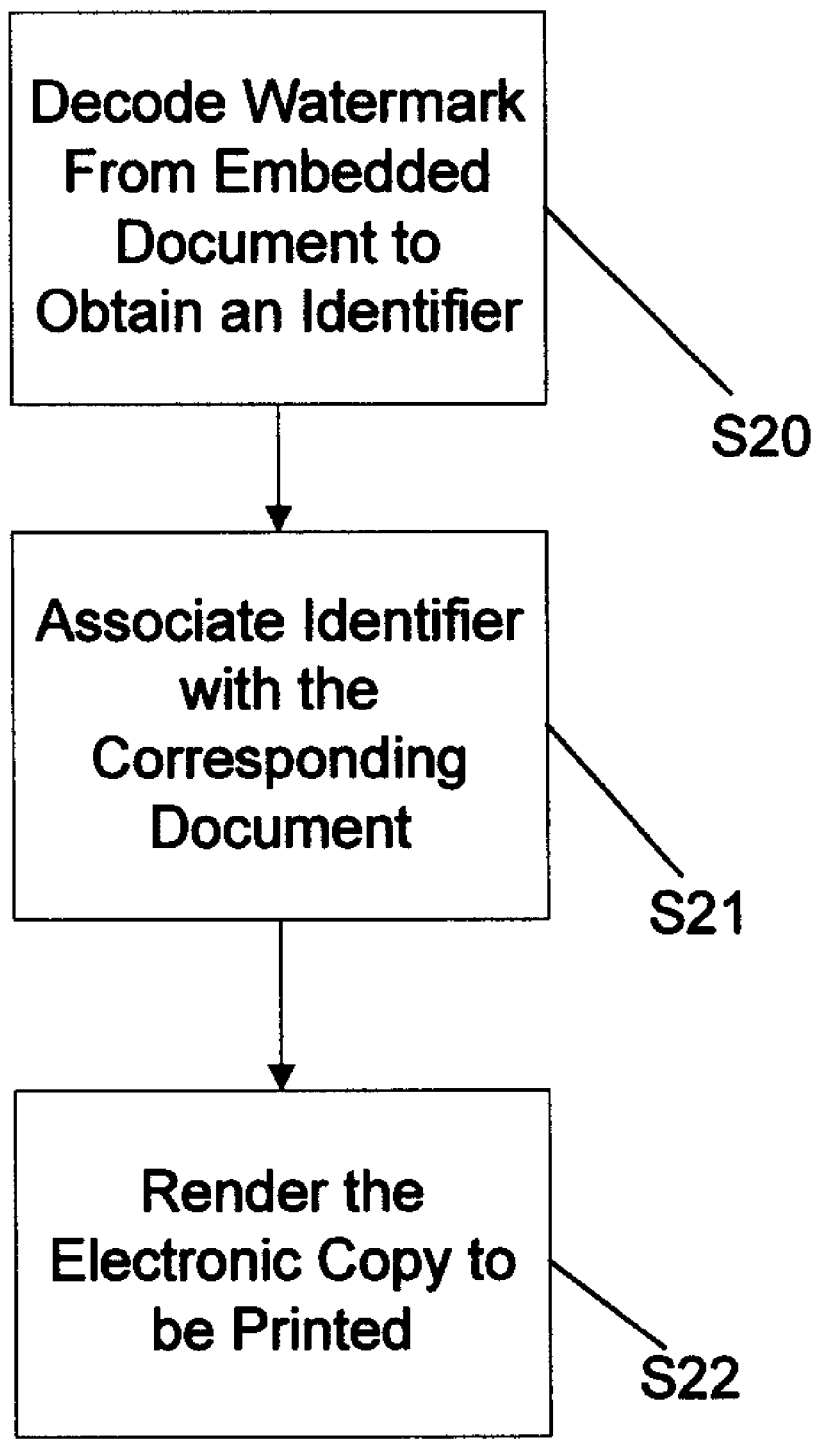
FIG. 5 is a flow diagram of a process for document management.

Now consider an embodiment implemented in a business or home-office environment. Say a business team is meeting in conference room B, on the first floor of a building. In the meeting, it becomes apparent that not everyone in the group has the same documentation. Luckily, the needed documents are watermarked with document identifiers. The watermarked documents are presented to a compliant device, which extracts and decodes the respective document identifier (see FIG. 5, step S20). A user interface allows the meeting participants to select a printing option and printing location. (In the case of a handheld device, the device communicates, perhaps wirelessly, with a network communication port. The user interface may reside on the handheld device itself.). The identifiers are associated in a network-accessible database according to corresponding electronic documents. An extracted, watermark identifier is used to interrogate the database to find an associated, or corresponding, electronic document (e.g., a Word file, Excel spreadsheet, PDF file, etc.). Network routing software determines a printer nearest (or convenient) to the compliant device and renders the electronic document to the printer for printing. Optionally, a message is communicated to the compliant device, indicating the printing location.

So-called fragile watermarks can be embedded within a document. A fragile watermark can be designed to be lost, or to degrade predictably, when the data set into which it is embedded is processed in some manner. Thus, for example, a fragile watermark may be designed so that if an image is JPEG compressed and then decompressed, the watermark is lost. Or if the image is printed, and subsequently scanned back into digital form, the watermark is corrupted in a foreseeable way. (Fragile watermark technology is disclosed, e.g., in commonly assigned application Ser. Nos. 09/234,780, 09/433,104, 09/498,223, 60/198,138, 09/562,516, 09/567, 405, 09/625,577, 09/645,779, and 60/232,163.). By such arrangements it is possible to infer how a data set has been processed by the attributes of a fragile watermark embedded in the original data set.

In one embodiment, a second watermark is embedded along with a fragile watermark in a document. The second watermark can include information pertaining author, printer, document version, user, etc. In this embodiment, when a compliant device decodes a document, and the fragile watermark is not detected, the document is determined to be a copy or duplicate. Information from the second watermark can be used to identify the source of the document. (The printer or user can be identified to determine a potential security breach.).

Event Tickets

Figure 6A:
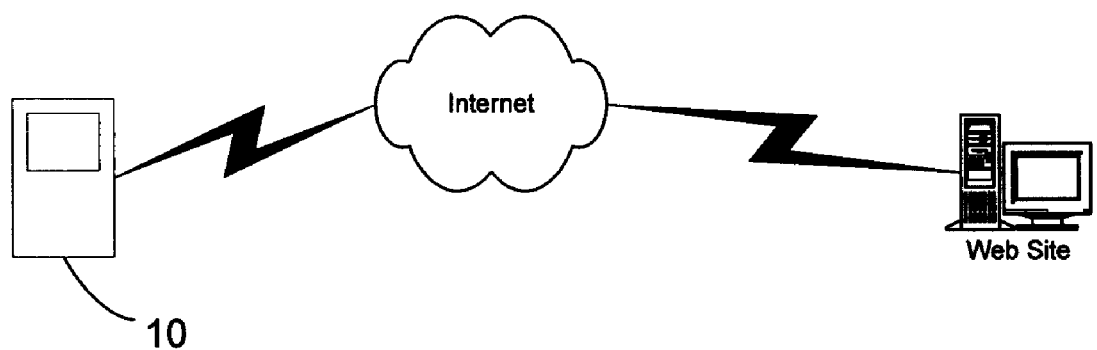
FIG. 6A is a functional diagram illustrating a handheld device communicating with a website via the internet.

Movie and other event tickets may be purchased on-line from various sources. A ticket may comprise many forms, including an authorization code, digital image, audio signal, text file, and digital signal. The ticket preferably includes a unique identifier or purchase code embedded therein. In one embodiment, the ticket is transferred to a purchaser's handheld device. Alternatively, the online movie ticket retailer transmits a ticket in the form of a payload, authentication code, or digital file to the user's computer. A plug-in on the user's computer is launched, which incorporates the ticket information when creating a watermarked image. (A handheld device can directly communicate with an online website, as shown in FIG. 6A, to retrieve a ticket. Or the handheld device can communicate with the website via a host computer, as shown in FIG. 2A.).

As noted in Assignee's U.S. Patent Application 60/257, 822, filed Dec. 21, 2000, a watermarked image can be presented on the LCD display, and captured by a web cam for various purposes. Accordingly, in a preferred embodiment, a watermarked ticket image is displayed on a handheld device.

Figure 6B:
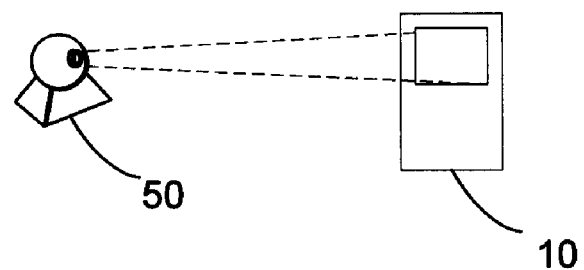
FIG. 6B is a functional diagram illustrating a watermark decoder capturing a watermark displayed on a handheld computing device screen.

At the movie theater, the ticket purchaser presents the handheld device, showing the watermarked image on the display screen, to a compliant watermark decoder 50, as shown in FIG. 6B. The decoder verifies authentic tickets by opening a gate or enabling a visual confirmation, e.g., a green light, or via a graphical user interface and/or with human intervention. The movie theater decoder can download a list of authentic payloads or identifiers prior to each movie showing or session, may query an online database to verify each ticket. The extracted identifier can be compared to the authentic identifiers to confirm a valid ticket. When the ticket identifier matches one of the authorized identifiers, the ticket is verified, and entry is permitted.

(Fragile watermarks are alternatively embedded in the electronic ticket to help avoid counterfeiting.)

Credit at a concession stand (or coupons for such) can be obtained by techniques like those above.

In still another embodiment, a movie or event poster (or flyer, advertisement, etc.) is digitally watermarked to include related event information, or a pointer to such information. A compliant handheld device extracts the embedded watermark information. In a first embodiment, an extracted watermark pointer (or index) is used to interrogate a database point to a web address (e.g., via a URL). The database (or web site) may include data records, including related event information. For example, for a movie poster, the related information may include ticket purchase information, trailers or clips, movie reviews, behind the scenes information, and much, much more. The database can be accessed via the internet, or via a network system. Alternatively, a database can be downloaded onto the handheld device.

Unique Device Identifiers

A handheld device can be configured to have a unique device identifier, presented via its display. Typically, a handheld device display comprises a plurality of pixels. In one embodiment, a microlens is added for each pixel, or a subset of the plurality of pixels. (Some so-called "camera-on-a-chip" devices are currently equipped with microlenses. These camera-on-a-chip devices use an all-CMOS process to build both a sensor array and additional on-chip signal-processing logic. In one example, the sensor array is organized as a 1,280×1,024 array, which corresponds to the higher resolution SXGA standard. A microlens for each pixel is added to enhance sensitivity, and provided for special color filter arrays.).

For handheld devices, the microlenses can be used to vary luminance of pixel elements. Indeed, the microlens can polarize light, e.g., in a horizontal and/or vertical direction. Microlenses can be arranged to create a pattern of horizontal and/or vertical polarizations. A unique device identifier can be determined from the pattern. (In a first embodiment, a pattern can be constructed to steganographically hide data, e.g., a device identifier. In another embodiment, the pattern mathematically corresponds with a device identifier. In still another embodiment, the pattern reveals a series of binary signals, which are used to determine the device identifier. In yet another embodiment, a Fourier analysis of the pattern reveals information used to determine the identifier. Artisans in the field know other ways to correlate a pattern with an identifier. Such may be suitably employed with the present invention.).

To an unfiltered eye (or camera), the polarized display appears normal. The various horizontal and/or vertical polarizations are typically undetected.

Adding a polarized filter, however, reveals the polarized luminance pattern. In this embodiment, an input device, e.g., a camera, web cam, optical sensor, imaging sensor, etc., includes a filter (e.g., a polarized filter, a luminance filter, etc.), which exposes the polarized pattern. An input device captures an image of the handheld device display (e.g., as shown in FIG. 6B). The captured image includes a polarized pattern, which includes (or hides) a unique device identifier. In the preferred embodiment, software is used to analyze a pattern and discern the corresponding device identifier.

In another embodiment, the device identifier is dynamic, in that it can change. To accomplish such, a set of microlens includes a bus structure (or energy receptacles) to receive electricity or energy (hereafter both referred to as "energy"). Energy is applied to the set of microlens to change their respective polarizations. The polarization pattern is thereby changed. Accordingly, the unique identifier can be changed. Software, running on the handheld device can be used to provide an interface to help change the unique identifier.

There are many applications involving such a device identifier. For example, referring to the "Event Tickets" section above, a user could present her handheld device when purchasing tickets. A filtered image of the handheld device display is captured to determine the unique device identifier. The watermarked ticket image (or authorization code) includes the corresponding device identifier. At the event location (e.g., movie theater), the watermarked ticket image is displayed via the polarized display. An image of the display is captured. The captured image (e.g., of the watermarked ticket image) is decoded to extract both the ticket authorization identifier and the polarized device identifier. An image of the display can be captured via a polarized-filter input device, which can be used to determine the unique device identifier. (Of course, one input device can also be used with different filters or a filter that allows both polarization filtering and typical image capture.). The decoded device identifier is compared with the captured device identifier. If they match, then entry is allowed (assuming the authorization matches.). In one embodiment, the embedded ticket authorization is the corresponding device identifier.

As a copy control, multi-media content can be bound to a particular handheld device via the device's display identifier.

A device identifier can be used in a security system or network access. For example, verifying the device display identifier is one step in a security system. (Such a system may also include entry of a PIN or password, etc.).

Of course there are many other applications with respect to uniquely identifying a handheld device via a polarized display.

Handheld Devices as Scanners

A handheld device equipped with, or in communication with, a digital camera or web camera, can be used as an image scanner. A digital or web camera captures image patches or swatches. Assuming a watermarked document is imaged, the captured pieces can be stitched back together to form the original image.

The watermark is embedded to include using an orientation or grid signal. The grid signal is redundantly embedded within a document. The grid signal can be key on, and used as a template when stitching pieces together. Specifically, image pieces or swatches can be oriented according to the grid signal, and then matched with adjacent pieces.

Accordingly, a handheld device (and an input device, e.g., a web cam) becomes a scanner.

CONCLUSION

The foregoing are just exemplary implementations using digital watermarking technology. It will be recognized that there are a great number of variations on these basic themes. The foregoing illustrates but a few applications of the detailed technology. There are many others.

While this application discusses a handheld computing device, the present invention is not so limited. Of course, a compliant device may include a desktop or laptop computer, or even a compliant kiosk.

To provide a comprehensive disclosure without unduly lengthening this specification, the above-mentioned patents and patent applications are hereby incorporated by reference. The particular combinations of elements and features in the above-detailed embodiments are exemplary only; the interchanging and substitution of these teachings with other teachings in this application and the incorporated-by-reference patents/applications are also contemplated.

The above-described methods and functionality can be facilitated with computer executable software stored on computer readable mediums, such as electronic memory circuits, RAM, ROM, magnetic media, optical media, removable media, etc. Such software may be stored on a handheld reading device. Instead of software, the watermarking functionality may be hardwired.

The section headings in this application (e.g., "Handheld Computing Device") are provided merely for the reader's convenience, and provide no substantive limitations. Of course, the disclosure under one section heading may be readily combined with the disclosure under another heading.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. A device comprising:
    an image or video display including a first set of elements and a second set of elements, the first set of elements being varied relative to at least the second set of elements, the first set of elements being arranged to provide a plural-bit device identifier obtainable from optical scan data representing at least a portion of the image or video display, the first set of elements and the second set of elements being arranged so as to conceal the presence of the plural-bit device identifier from a human observer of the display.

2. The device of claim 1 further comprising electronic circuitry to energize at least the first elements so as to change the plural-bit device identifier.

3. A device comprising:
    an image or video display including a first set of elements and a second set of elements, wherein the first set of elements comprises micro-lenses, the first set of elements being varied relative to at least the second set of elements, the first set of elements being arranged to provide a plural-bit device identifier obtainable from optical scan data representing at least a portion of the image or video display, the first set of elements and the second set of elements being arranged so as to conceal the presence of the plural-bit device identifier from a human observer of the display.

4. The device of claim 3 wherein the second set of elements comprises micro-lenses.

5. The device according to claim 1 wherein the first set of elements comprises a first filter.

6. The device according to claim 5 wherein the second set of elements comprises a second filter.

7. The device of claim 1 wherein the device comprises a handheld device.

8. A device comprising at least an image or video display, the image or video display including at least a first set of pixel elements, the first set of pixel elements being arranged to provide a machine-readable, plural-bit device identifier obtainable from optical scan data representing at least a portion of the image or video display, the device identifier uniquely identifies the device or device type.

9. The device according to claim 8, where the image or video display further comprises a second set of pixel elements, where the first set of pixel elements are varied relative to at least the second set of pixel elements.

10. The device according to claim 9, the first set of pixel elements and the second set of pixel elements being arranged so as to conceal the presence of the machine-readable, plural-bit device identifier from a human observer of the display.

11. The device according to claim 8 where the first set of pixel elements comprises micro-lenses.

* * * * *